2,782,169
CONTINUOUS PROCESS FOR PRODUCING BITUMINOUS EMULSIONS

Eldon C. Brown, Rutherford, Wilfred H. Driesen, Mountain Lakes, and Jacob S. Guepet, Clifton, N. J., assignors to The Patent and Licensing Corporation, New York, N. Y., a corporation of Massachusetts No Drawing. Application August 21, 1952, Serial No. 305,714

13 Claims. (Cl. 252—311.5)

This invention relates to a process for the production of emulsions, and more particularly has reference to the production of emulsions of a bitumen such as asphalt in an aqueous vehicle, utilizing clay as a dispersing agent and to the product produced thereby.

Emulsions of bituminous materials such as pitch and asphalt in an aqueous vehicle are well-known. Those in commercial production generally fall into two classes; one utilizing a soap or detergent as the dispersing agent, and the other utilizing a mineral colloid or clay as the dispersing agent. In many applications, the clay type emulsions are particularly advantageous. Production of these emulsions, however, involves rather critical limitations on conditions in the process of making the emulsion. They have previously been made by a method utilizing a particular vortex mixer and auxiliary cooling and mixing equipment. They have also been of a large asphalt particle size.

While soap-bitumen emulsions were made successfully, various attempts to produce these bitumen-clay emulsions on attrition type colloid mill equipment were without success. These bitumen-clay emulsions should have the properties of forming a dry film of the composition having a honey-comb structure of the character which renders the dry film resistant to flow in temperature in excess of the softening point of the bitumen. In addition, a dried film should be resistant to re-dispersion in water. The emulsion itself should contain as little water as possible, while maintaining a sufficiently low viscosity for easy application both from the point of view of the ease of drying the film and from the point of view of keeping the cost of shipping down, also ease of handling, barreling, etc.

It is desirable to produce a product of smaller particle size than heretofore, including among the advantages the maintenance of a constant viscosity during storage. The emulsion should be more stable than the soap type emulsion in the presence of such materials as cement.

It is, therefore, an object of the present invention to provide a process for continuously producing a bitumen-clay emulsion in water on attrition type colloid mill equipment.

It is a further object of the present invention to provide a process for producing a bitumen-clay emulsion of a small particle size.

It is a further object of the present invention to provide a process for producing a bitumen-clay emulsion in water wherein the dispersion contains not more than 50% water.

It is a further object of the present invention to provide a bitumen-clay emulsion in water wherein the emulsion contains not more than 50% water, wherein the dispersion is stable over long periods of storage and the dried film from the emulsion is resistant to flow and re-dispersion.

These and other objects are attained by the present invention which relates to a new clay type bituminous emulsion and to a continuous process for producing bituminous emulsions containing clay, which comprises mixing water and clay together with sufficient acidic material to produce a pH of 4.0 to 4.5 and passing this mixture together with molten bitumen continuously through an attrition type colloid mill. Preferably, there should also be added a viscosity adjusting agent such as ligno sulphonate, one of which is known commercially as Marasperse.

The following example illustrates a preferred embodiment of the invention, but it will be understood that substitutions and variations may be made within the scope of the claims.

Example

In a mixing vessel equipped with an agitating device there was placed 3.3 parts by weight of bentonite, 0.0875 part potassium bichromate, 0.08 part ortho-phosphoric acid, 0.025 part ligno sulphonate (Marasperse N) and 46.0 parts water. The mixture was heated to 75–85° F. and the pH further adjusted to the range 4.0–4.5 by adding additional ortho-phosphoric acid. In a separate heated tank 50.5 parts 100–120 penetration and 105–115° M. P. asphalt is heated to a temperature of 190–200° F. The contents of each tank are fed into a Charlotte colloid mill. The product from the colloid mill is a dispersion of a buttery consistency, suitable for packaging and having an asphalt particle size primarily in the range 3 to 10 microns.

Instead of the acidic materials employed in the example for controlling the pH, there may be utilized acids such as oxalic, chromic, hydrochloric, benzoic, etc. Acid salts such as aluminum sulphate, sodium phosphate, calcium acid phosphate, etc. may be used either alone or in admixture with an acid.

The use of a viscosity adjusting agent is important in order to obtain a dispersion which is sufficiently mobile, for use without the necessity of the additional step of agitating the dispersion at reduced temperature in a pug mill or the like to decrease the viscosity. Besides the ligno-sulphonate disclosed in the example, other suitable viscosity adjusting agents may be used which are highly soluble but not highly ionizable organic compounds containing hydroxyl or carboxyl groups, such as pyrogallic acid.

The water content of the composition is in the range of 44% to 50% by weight. Lower water content gives an extremely viscous or even inverted emulsion whereas higher water contents yield emulsions which are more difficult to dry and more expensive to transport and are not as finely dispersed.

The bitumen as used here may comprise, for example, asphalt or other bituminous material, either of a solid or semi-solid consistency, and may be either native asphalt or asphalt of the so-called artificial variety produced by refining residuums. In place of asphalts, it is possible to disperse materials of an analogous nature such as coal tar pitch.

Preferred asphalts may have penetrations of from 0 to as high as 200 at 77° F. (ASTM D5–25) and softening or melting point from about 70° F. to 200° F. A range of emulsions can be made from material that is liquid at room temperature or from bitumen which contains gilsonite, the temperature of the asphalt entering the colloid mill and the temperature of the colloid mill being adjusted accordingly to maintain the asphalt in a liquid state.

Asphalts of various melting points may be used in the present process and product and the temperature of the emulsification will, of course, vary with the melting point of the asphalt. For example, emulsification temperatures of 150° F. are suitable for 100° to 130° F. melting point asphalt whereas emulsification temperature of 190° to 200° F. are desirable for 180° to 190° F. asphalt.

While the example has mentioned the Charlotte colloid mill, the term colloid mill as used herein includes dispersers and homogenizers such as the attrition type Lancaster disperser and other devices which tend to shear particles or pass them between small clearances as in the device as mentioned. These devices are preferably fed under pressure, but not necessarily so. The devices are well-known to the art, and are not per se part of the present invention.

Where the term emulsion has been used herein, it is intended to include aqueous suspensions of solid or semi-solid materials which are dispersed in a fine state of subdivision.

It is a particularly important characteristic of the present invention that in its preferred form, the emulsion leaves the colloid mill with a substantially low viscosity, and it may be moved into containers without the additional step of milling it to reduce the viscosity.

It will be understood that the emulsions produced by the present process are soap free, relying entirely on the emulsifying properties of the clay.

While various types of clay may be used with or without other colloidal material, bentonite is preferred. One of the advantages of bentonite is its ability to last in the emulsion over long periods of time, as well as its ability of forming, when water is eliminated from a film of the emulsion, a honey-comb structure which renders the dry film resistant to flow at temperatures in excess of the melting point of the bitumen.

The emulsion produced by the present process is particularly suitable as an asphalt tile cement and adhesive and waterproof coating in roofing and flooring. It may be admixed with cement to produce a mastic for coating floors. It may be used to spray the inside of tanks to make them waterproof. It may be used to spray or otherwise coat wall surfacing to waterproof them, and as a base for embedding granule weathering material on the wall. The emulsion may be filled with asbestos or the like and used as an insulating coating for railroad cars, boats and the like. It may be combined with sand or other fillers and used as sound deadening material and undercoating for automobiles.

As used herein, the particle size range 3 to 10 microns means that more than half of the material will fall in this range and that the average of all particles will be in this range.

The pH of the clap slip is an important factor in the process. The final pH of the entire emulsion is not critical since certain asphalts may raise the final pH as high as 8. If the pH of the clay slip is below 4.0, the viscosity of the emulsion increases undesirably. Higher pH than 4.5 tends to prevent formation of a stable emulsion.

Among the many advantages of the product are included an improved bond, an improved penetration, and resistance to breakdown with electrolytes such as are present in cement. Dried films have a desirable honey-comb structure resistant to temperatures in excess of the softening point of the bitumen and resistant to re-dispersion in water.

We claim:

1. A bituminous emulsion containing clay as the emulsifying agent and having the majority of bitumen particles of a size from 3 to 10 microns.

2. A bituminous emulsion containing clay as the emulsifying agent and having the majority of bitumen particles of a size from 3 to 10 microns, and having a water content of 44% to 50% by weight.

3. An asphaltic emulsion containing clay as the emulsifying agent and having the majority of asphalt particles of a size from 3 to 10 microns, and having a water content of 44% to 50% by weight.

4. An asphaltic emulsion containing Bentonite as the emulsifying agent and having the majority of asphalt particles of a size from 3 to 10 microns, and having a water content of 44% to 50% by weight.

5. An asphaltic emulsion containing clay as the emulsifying agent and having the majority of asphalt particles of a size from 3 to 10 microns, and having a water content of 44% to 50% by weight, and containing lignon sulphonate as a thinner.

6. An asphaltic emulsion containing clay as the emulsifying agent and having the majority of asphalt particles of a size from 3 to 10 microns, and having a water content of 44% to 50% by weight, said asphalt having a melt point in the range 105°–115° F. and a penetration of 100–120.

7. An asphaltic emulsion containing Bentonite as the emulsifying agent and having the majority of asphalt particles of a size from 3 to 10 microns, and having a water content of 44% to 50% by weight, and containing lignon sulphonate as a thinner, said asphalt having a melt point in the range 105°–115° F. and a penetration of 100–120.

8. A process for the production of an asphalt-clay emulsion comprising simultaneously passing through an attrition type colloid mill a molten asphalt and a clay slip comprising Bentonite clay and water adjusted to a pH in the range 4.0 to 4.5 the water comprising 44% to 50% by weight of the finished emulsion.

9. A process for the production of a bitumen-clay emulsion comprising simultaneously passing through an attrition type colloid mill a molten bitumen and a clay slip comprising clay and water adjusted to a pH in the range 4.0 to 4.5, the water comprising 44% to 50% by weight of the finished emulsion.

10. A process for the production of an asphalt-clay emulsion comprising simultaneously passing through an attrition type colloid mill a molten asphalt and a clay slip comprising clay and water adjusted to a pH in the range 4.0 to 4.5, said asphalt having a melt point in the range 105°–115° F. and a penetration of 100–200 the water comprising 44% to 50% by weight of the finished emulsion.

11. A process for the production of an asphalt-clay emulsion comprising simultaneously passing through an attrition type colloid mill a molten asphalt, a ligno sulphonate and a clay slip comprising clay and water adjusted to a pH in the range 4.0 to 4.5 the water comprising 44% to 50% by weight of the finished emulsion.

12. A process for the production of an asphalt-clay emulsion comprising simultaneously passing through an attrition type colloid mill a molten asphalt and a clay slip comprising clay and water adjusted to a pH in the range 4.0 to 4.5 with chromic acid the water comprising 44% to 50% by weight of the finished emulsion.

13. A process for the production of an asphalt-clay emulsion comprising simultaneously passing through an attrition type colloid mill a molten asphalt, a ligno sulphonate and a clay slip comprising clay and water adjusted to a pH in the range 4.0 to 4.5, the water comprising 44% to 50% by weight of the finished emulsion, said asphalt having a melt point in the range 105°–115° F. and a penetration of 100–120.

References Cited in the file of this patent
UNITED STATES PATENTS

| | | |
|---|---|---|
| 1,918,759 | Kirschbraun | July 18, 1933 |
| 2,481,374 | Watts et al. | Sept. 4, 1949 |
| 2,521,542 | Schwartz | Sept. 5, 1950 |
| 2,620,312 | Manzer | Dec. 2, 1952 |